US007413259B2

(12) United States Patent
Verdun et al.

(10) Patent No.: US 7,413,259 B2
(45) Date of Patent: Aug. 19, 2008

(54) HUB AND EXTENSION ARRANGEMENT FOR AN AXLE HAVING DUAL WHEELS

(75) Inventors: Jonathon P. Verdun, Windsor (CA); Daniel Tasich, Orchard Lake, MI (US); Dean M. Puzdrakiewicz, Macomb, MI (US); Charles A. Boski, Dearborn, MI (US)

(73) Assignee: Chrysler LLC, Auburn Hills, MI (US)

( * ) Notice: Subject to any disclaimer, the term of this patent is extended or adjusted under 35 U.S.C. 154(b) by 79 days.

(21) Appl. No.: 11/383,546

(22) Filed: May 16, 2006

(65) Prior Publication Data

US 2007/0267914 A1    Nov. 22, 2007

(51) Int. Cl.
*B60B 11/00* (2006.01)
*B60T 1/06* (2006.01)
(52) U.S. Cl. ............... 301/35.628; 301/36.1; 188/17
(58) Field of Classification Search .......... 301/6.1, 301/36.1, 35.628; 188/17, 18 A, 26, 218 R, 188/218 XL
See application file for complete search history.

(56) References Cited

U.S. PATENT DOCUMENTS

| 1,640,338 | A | * | 8/1927 | Kay ........................ 301/36.1 |
| 2,239,463 | A | * | 4/1941 | Mills ........................ 301/9.2 |
| 2,516,896 | A | * | 8/1950 | Manning .................. 301/36.1 |
| 2,635,012 | A | * | 4/1953 | Rappaport ............... 301/36.1 |
| 3,009,742 | A | * | 11/1961 | Rabe et al. ............ 301/35.627 |
| 4,070,066 | A | * | 1/1978 | Reppert et al. .......... 301/36.1 |
| 6,848,526 | B2 | * | 2/2005 | Burt et al. ............ 301/35.628 |
| 6,889,802 | B2 | * | 5/2005 | Hamperl ............... 188/218 XL |

* cited by examiner

*Primary Examiner*—Jason R Bellinger
(74) *Attorney, Agent, or Firm*—Ralph E. Smith

(57) ABSTRACT

A hub and extension arrangement for an axle supporting dual wheels includes an axle supporting an inboard wheel and an outboard wheel and a hub supported by the axle and including a first mounting portion. An extension is supported by the axle and includes a third mounting portion and an arm attached to the inboard wheel and the outboard wheel. A rotor is supported by the axle and includes a braking portion and a second mounting portion. The second mounting portion is disposed between, and attached to, the first mounting portion and the third mounting portion to allow for servicing of the rotor without removal of the axle from the hub.

20 Claims, 3 Drawing Sheets

HUB AND EXTENSION ARRANGEMENT FOR AN AXLE HAVING DUAL WHEELS

FIELD OF THE INVENTION

The present teachings generally relate to axles having dual rear wheels, and more particularly, to a wheel hub and extension arrangement for an axle having dual rear wheels.

BACKGROUND OF THE INVENTION

Trucks having dual rear wheels typically include an axle having an extension that properly spaces each wheel relative to a rotor of a truck. The extension is commonly mounted to the rotor and to a center portion of an inboard wheel of the dual-wheel arrangement such that the extension is generally disposed between the rotor and the inboard wheel. The rotor is typically attached to the axle to selectively prevent the extension, and thus the wheels, from rotating relative to the truck.

A conventional dual-wheel arrangement Q is shown in FIG. 1, and includes a rotor R and an extension S. An axle spindle T extends through a center portion of the rotor R and extension S and supports an inboard and outboard wheel U. The extension S is free to rotate relative to the spindle via inboard and outboard bearing sets V and is retained to the spindle T via a retaining nut W. An axle shaft X passes through a center of the spindle T and is bolted to the extension S. Such an arrangement adequately allows each wheel U to rotate with the rotor R, but requires removal of the extension S, wheels U, axle shaft X, retaining nut W, and outer bearing V when servicing the rotor R of the dual-wheel arrangement Q.

Specifically, when servicing the rotor R, each wheel U must first be removed from the extension S. Once the wheels U are removed, the axle shaft X is detached from the extension S. This allows access to remove the retaining nut W and permits removal of the outer bearing V. With the outer bearing V removed, the rotor R and extension S can be removed as an assembly. With the rotor R and extension S separated from the axle spindle T, access to fasteners Y holding the rotor R to the extension S can be removed. With the fasteners Y removed, the rotor R can be separated from the extension S. Requiring removal of the axle shaft X, rotor R, and extension S adds complexity and cost to the repair and/or replacement of the rotor R.

Therefore, an extension arrangement for an axle supporting dual wheels that allows for easy servicing of a rotor without requiring removal of an axle or the extension is desirable in the industry.

SUMMARY OF THE INVENTION

A hub and extension arrangement for an axle supporting dual wheels includes an axle supporting an inboard wheel and an outboard wheel and a hub supported by the axle and including a first mounting portion. An extension is supported by the axle and includes a third mounting portion and an arm attached to the inboard wheel and the outboard wheel. A brake rotor is supported by the axle and includes a braking portion and a second mounting portion, The second mounting portion is disposed between, and attached to, the first mounting portion and the third mounting portion to allow for servicing of the rotor without removal of the axle from the hub.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description is merely exemplary in nature and is in no way intended to limit the invention, its application, or uses.

Figure 1:
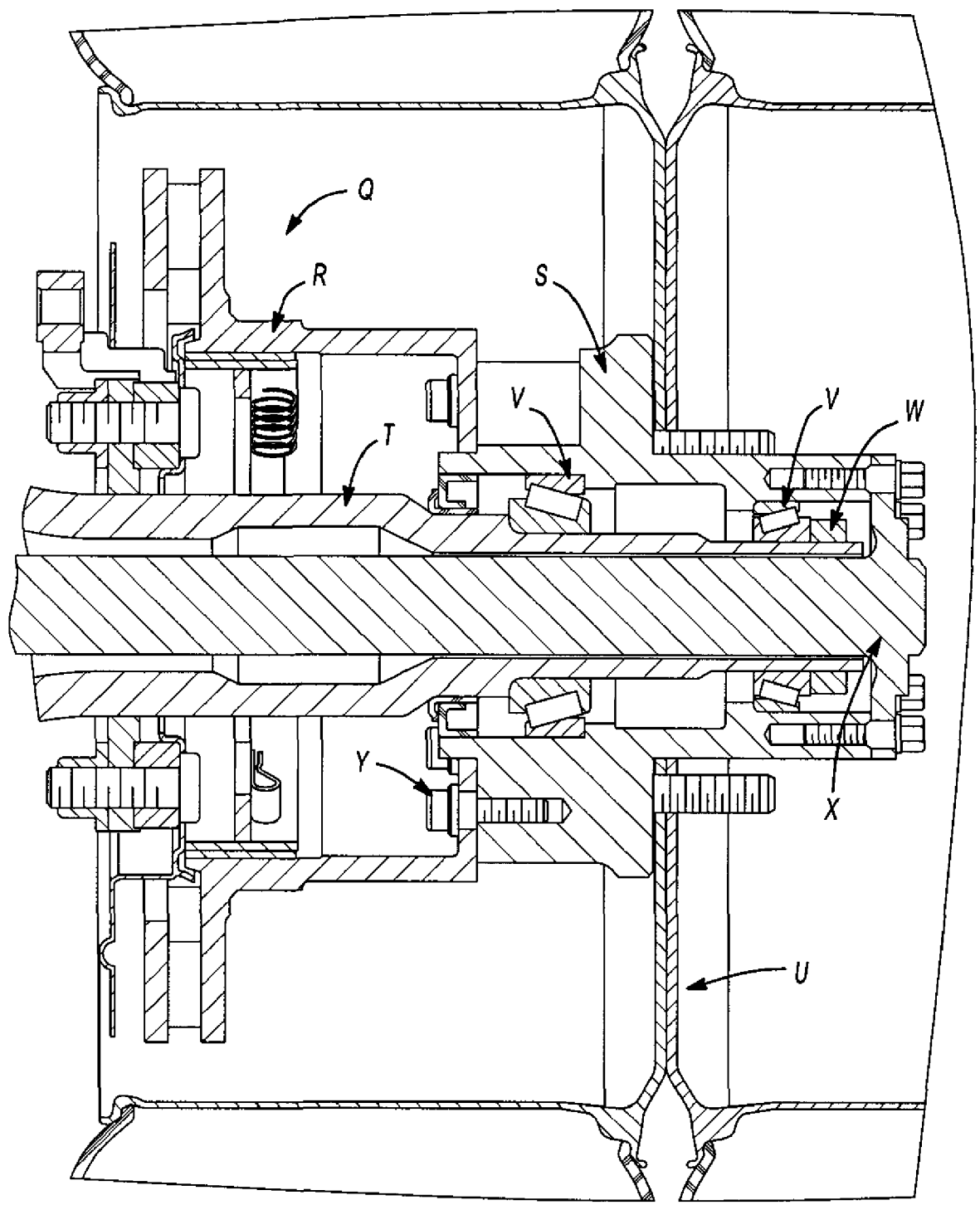
FIG. 1 is a sectional view of a prior art extension arrangement for an axle supporting dual wheels.
Figure 2:
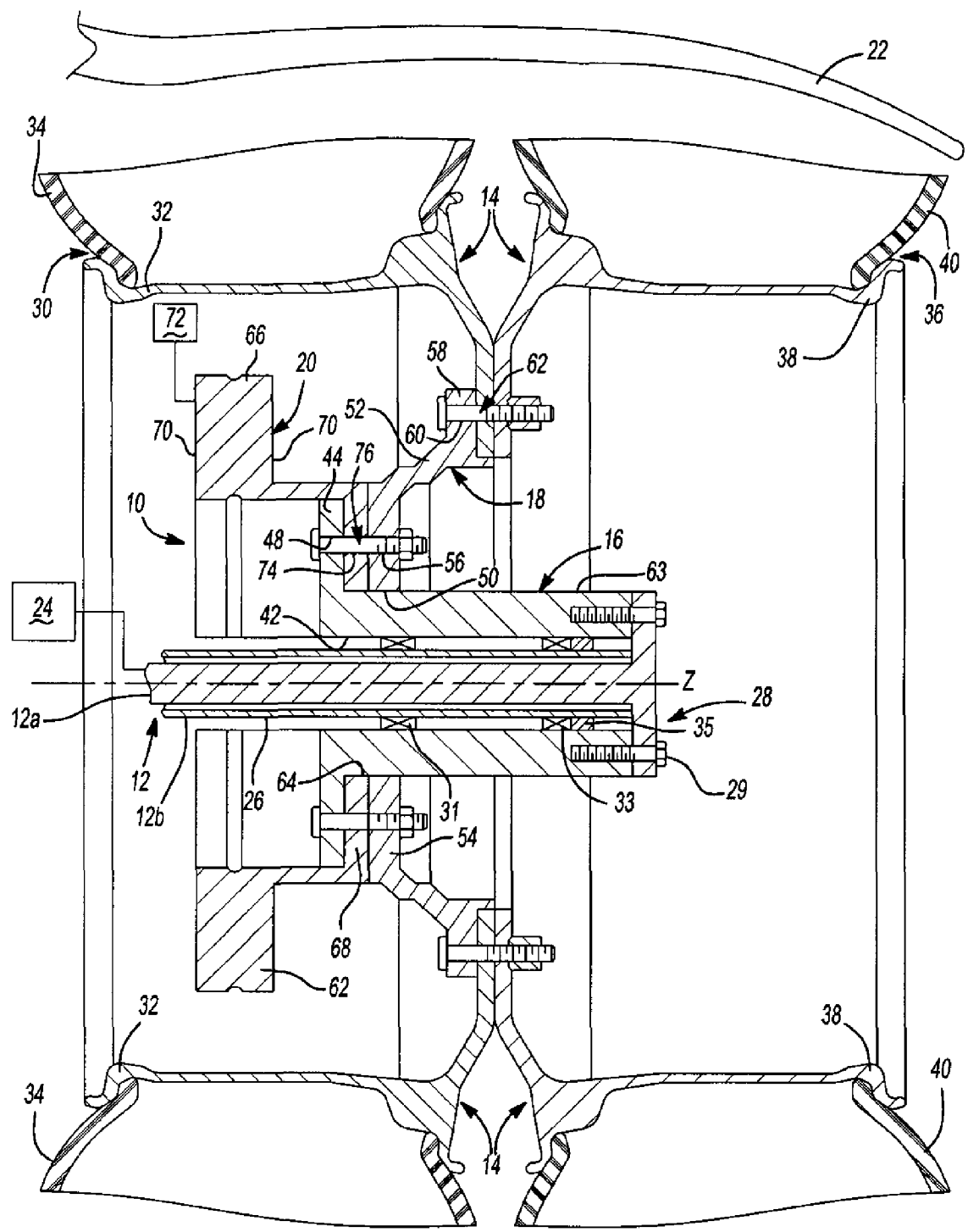
FIG. 2 is a sectional view of a hub and extension arrangement in accordance with the principles of the present teachings for an axle supporting dual wheels.
Figure 3:
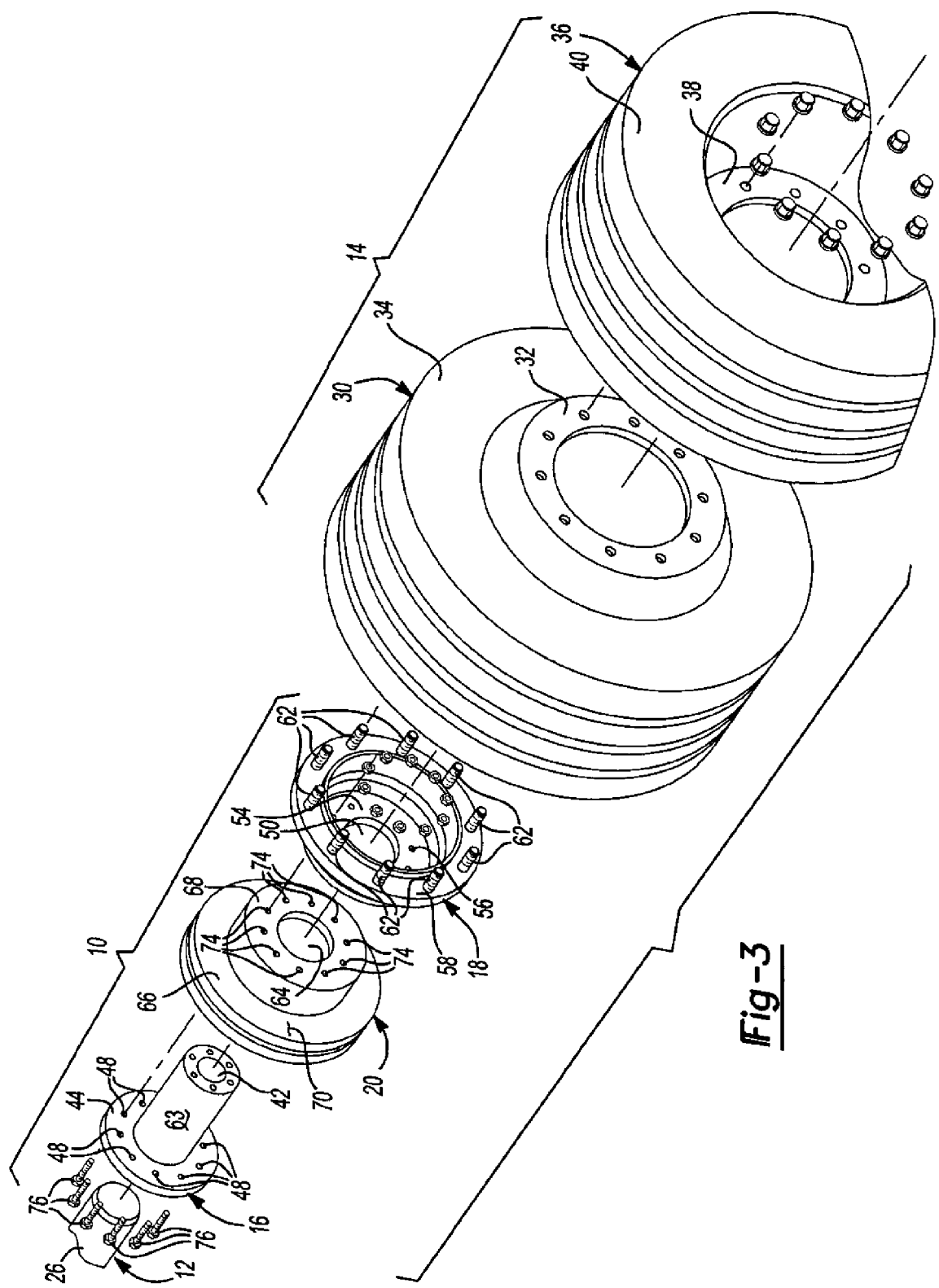
FIG. 3 is an exploded view of the hub and extension arrangement of FIG. 2.

With reference to FIGS. 2 and 3, a hub and extension apparatus 10 for an axle assembly 12 supporting a dual-wheel arrangement 14 is provided and includes a hub 16, an extension 18, and a rotor 20. The hub 16, extension 18, and rotor 20 are positioned on the axle assembly 12 and cooperate generally to position the dual-wheel arrangement 14 relative to a vehicle 22.

The axle assembly 12 includes an axle shaft 12a and an axle spindle 12b. The axle shaft 12a is rotatably driven by a power train 24 of the vehicle 22 and includes a generally elongate body 26 and an attachment mechanism 28 located at a distal end thereof for interaction with the hub 16. The attachment mechanism 28 is shown as an axle-to-hub bolt 29, but may be any mechanism suitable for fixing the distal end of the axle shaft 12a for rotation with the hub 16 such as, but not limited to, a series of splines, projections, and/or keys that interact with the hub 16.

The dual-wheel arrangement 14 is attached to the hub and extension apparatus 10 such that the dual-wheel arrangement 14 is fixed for rotation with the hub 16, extension 18, and rotor 20. The dual-wheel arrangement 14 includes an inboard wheel 30 having a rim 32 and a tire 34 and an outboard wheel 36 having a rim 38 and a tire 40. The inboard wheel 30 generally surrounds the rotor 20 while the outboard wheel 36 is positioned proximate to an exterior surface of the vehicle and generally near the distal end of the axle shaft 12a and axle spindle 12b.

The hub 16 is fixed to the axle shaft 12a for rotation therewith and includes a central aperture 42, and a flange 44. The central aperture 42 extends along the length of the hub 16 and includes inner and outer bearings 31, 33 and an attachment mechanism 46 for interaction with the attachment mechanism 28 of the axle shaft 12a. The inner and outer bearings 31, 33 are generally disposed between the hub 16 and the axle spindle 12b with the outer bearings 33 attached to the axle spindle 12b by a retaining nut 35. While the attachment mechanism 28 is shown as an axle-to-hub bolt 29, the attachment mechanism 46 of the hub 16 may alternatively include at least one of a spline, a projection, and/or a key for mating engagement with the attachment mechanism 28 of the axle assembly 12. The flange 44 axially surrounds the hub 16 about an axis of rotation Z and includes a plurality of attachment apertures 48.

The extension 18 is fixedly attached to the flange 44 of the hub 16 and includes a central aperture 50 and an arm 52 extending generally from a main body 54. The central aperture 50 is received by the hub 16 and is coaxially aligned with an axis of rotation Z of the axle shaft 12a. The main body 54 generally surrounds the central aperture 50 and includes a plurality of attachment apertures 56 for use in attaching the extension 18 to the hub 16. The arms 52 extend generally from the main body 54 and include a mounting location 58 having an attachment aperture 60. The mounting location generally engages an inner surface of the rim 32 of the inboard wheel 30 and receives a fastener 62 generally through the attachment aperture 60 for fixedly attaching the arms 52 to the rim 32 of the inboard wheel 30 and the rim 38 of the outboard wheel 36. The fastener 62 therefore fixes the inboard wheel 30 and the outboard wheel 36 for rotation with the extension 18 and may be any suitable fastener that fixedly attaches the arms 52 to the inboard and outboard wheels 30, 36 such as, but not limited to, a press-fit stud or a nut and bolt arrangement.

The rotor 20 is positioned over the axle assembly 12 and includes a central aperture 64, a brake portion 66, and a flange 68. The central aperture 64 is positioned over an outer surface 63 of the hub 16 such that the flange 68 is in an abutting relationship with the flange 44 of the hub 16. The brake portion 66 extends generally from the flange 68 and includes an engagement surface 70 for interaction with a braking mechanism 72. The flange 68 extends down from the brake portion 66 and includes a plurality of apertures 74 for use in fixedly attaching the flange 68 of the rotor 20 to the hub 16 and extension 18.

When assembled, the hub 16 is positioned over the axle assembly 12 such that the inner and outer bearings 31, 33 are engaged and interact with the attachment mechanisms 28, 46 at a distal end of the axle assembly 12. Once the hub 16 is positioned on the axle assembly 12 and is fixed for rotation with the axle shaft 12a, the rotor 20 may be positioned over the outer surface 63 of the hub 16 until the flange 68 of the rotor 20 is in an abutting relationship with the flange 44 of the hub 16.

The extension 18 may be positioned on the outer surface 63 of the hub 16 once the rotor 20 is in place such that the main body 54 is in an abutting relationship with the flange 68 of the rotor 20. Once the flange 44 of the hub 16, the flange 68 of the rotor 20, and the main body 54 of the extension 18 are in an abutting relationship, the respective attachment apertures 48, 56 and 74, may be aligned such that a fastener 76 may be inserted therethrough to fixedly attach the hub 16, extension 18, and rotor 20 for rotation with the axle shaft 12a. The fastener 76 may be of any suitable construction, such as, but not limited to a press-fit stud or a nut and bolt arrangement.

Once the hub 16, extension 18, and rotor 20 are fixed for rotation with the axle shaft 12a, the inboard and outboard wheels 30, 36 may be positioned on the hub 16 such that the rim 32 of the inboard wheel 30 and the rim 38 of the outboard wheel 36 are aligned with the mounting location 58 of the extension 18. Once properly aligned, the fastener 62 may be inserted through the attachment aperture 60 of the arms 52 to fixedly attach the inboard and outboard wheels 30, 36 to the extension 18. Attaching the extension 18 to the inboard and outboard wheels 30, 36 fixes the inboard and outboard wheels 30, 36 for rotation with the hub 16, extension 18, and rotor 20.

With particular reference to FIG. 2, disassembly of the hub and extension apparatus 10 for servicing of the rotor 20 will be described in detail. To service and/or remove or replace the rotor 20, the outboard and inboard wheels 30, 36 must first be removed from the hub and extension apparatus 10. Therefore, the fastener 62 is first disengaged from the mounting location 58 of the extension 18 as well as from the rim 32 of the inboard wheel 30 and from the rim 38 of the outboard wheel 36. At this point, the hub 16, extension 18, and rotor 20 are still fixed for rotation with the axle assembly 12 due to engagement between the fastener 76 and the attachment apertures 48, 56, and 74.

To obtain access to the rotor 20, the fastener 76 is removed from engagement with the hub 16, extension 18, and rotor 20, such that the extension 18 may be removed from engagement with the hub 16. Once the extension 18 is removed from engagement with the hub 16, access to the rotor 20 for repair and/or replacement is permitted.

As described, access to the rotor 20 for repair and/or replacement is achieved without having to disassemble the axle shaft 12a and/or hub 16. Specifically, access to the rotor 20 is achieved without having to disconnect or remove the axle shaft 12a from engagement with the hub 16. This relationship saves time in servicing the rotor as the axle shaft 12a and hub 16 do not require disassembly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A hub and extension arrangement for an axle supporting dual wheels comprising;
   an axle supporting an inboard wheel and an outboard wheel;
   a hub operably supported by said axle and including a hub mounting portion;
   an extension operably supported by said axle and including a extension mounting portion and an arm attached to said inboard wheel and said outboard wheel; and
   a rotor operably supported by said axle and including a braking portion and a rotor mounting portion disposed between, and attached to, said hub mounting portion and said extension mounting portion.

2. The hub and extension arrangement of claim 1, wherein said hub includes a hub aperture, said extension includes an extension aperture, and said rotor includes a rotor aperture, said hub, extension, and rotor apertures coaxially aligned with an axis of rotation of said axle.

3. The hub and extension arrangement of claim 2, wherein said hub aperture receives said axle and is fixed for rotation therewith.

4. The hub and extension arrangement of claim 1, wherein said hub mounting portion, said rotor mounting portion, and said extension mounting portion each include at least one mounting aperture.

5. The hub and extension arrangement of claim 4, wherein said hub mounting portion, said rotor mounting portion, and said extension mounting portion are attached by at least one fastener received through said at least one mounting aperture.

6. The hub and extension arrangement of claim 5, wherein said at least one fastener is at least one of a bolt and a press-fit stud.

7. The hub and extension arrangement of claim 1, wherein said arm extends from said extension mounting portion.

8. The hub and extension arrangement of claim 7, wherein said arm is attached to said inboard wheel and said outboard wheel by at least one fastener.

9. The hub and extension arrangement of claim 8, wherein said at least one fastener is at least one of a bolt and a press-fit stud.

10. A method comprising;
   inserting a hub having a hub mounting portion on an axle;
   inserting a rotor having a rotor mounting portion on said axle;
   positioning said rotor mounting portion adjacent to said hub mounting portion;
   inserting an extension having a extension mounting portion on said axle;
   positioning said extension mounting portion adjacent to said rotor mounting portion; and
   extending at least one fastener through said hub mounting portion, said rotor mounting portion, and said extension mounting portion to fix said hub, said rotor, and said extension together.

11. The method of claim 10, further comprising fixing said hub for rotation with said axle.

12. The method of claim 10, further comprising attaching an inboard wheel and an outboard wheel to said extension.

13. The method of claim 10, further comprising attaching a nut on said at least one fastener.

14. The method of claim 10, further comprising press-fitting a nut on said at least one fastener.

15. A method comprising;
   detaching an outboard wheel from an extension;
   detaching an inboard wheel from said extension;
   removing said outboard wheel from an axle of a vehicle;
   removing said inboard wheel from said axle of said vehicle;
   detaching said extension from a rotor and a hub;
   removing said extension from said axle; and
   servicing a rotor disposed on said axle without removing said axle from said vehicle.

16. The method of claim 15, wherein said detaching said outboard wheel and said inboard wheel includes removing at least one fastener.

17. The method of claim 15, wherein said detaching said extension from said rotor and said hub includes removing at least one fastener.

18. The method of claim 17, wherein said removing said at least one fastener includes removing a nut and bolt arrangement.

19. The method of claim 15, wherein said servicing said rotor includes removing said rotor from said axle.

20. The method of claim 15, wherein said servicing said rotor includes maintaining engagement between said hub and said axle.

* * * * *